UNITED STATES PATENT OFFICE.

FREDERICK K. FISH, JR., OF NEW YORK, N. Y.

SAPLESS COMPOSITE WOOD.

1,328,656.  Specification of Letters Patent.  Patented Jan. 20, 1920.

No Drawing.  Application filed April 30, 1919. Serial No. 293,861.

*To all whom it may concern:*

Be it known that I, FREDERICK K. FISH, Jr., a citizen of the United States of America, residing at 2 Stone street, New York city, in the county of New York and State of New York, have invented certain new and useful Improvements in Sapless Composite Wood, of which the following is a specification.

This invention relates to a new article of manufacture which is a wood having its sap and soluble gums removed therefrom and a foreign preservative of the wood introduced thereinto, which renders it a superior article for the use to which wood is ordinarily put.

The underlying characteristic condition of the wood constituting the new article of manufacture will be better appreciated when it is stated that it is a condition resulting from the use of water under pressure or an equivalent vehicle capable of dissolving and removing the soluble gums and sap from the wood without decomposing or removing the resins thereof and thereafter permeating the body of the individual fiber of the wood with its contained resins and a foreign preservative.

The important and essential step of the process is carried out by the use of heated water under pressure, as distinguished from the mere pressure or heat conveying medium such as steam, resulting in the elimination of the soluble gums and sap.

After the step of subjecting the wood to heated water under considerable pressure, it may be treated alternately to vacuum and pressure, with suitable heating steps, if necessary, to prevent hardening of the resin and the closing of the pores of the wood until the process is completed; these additional steps having the effect of insuring permeation by the resin and foreign preservative of the body of the individual fiber and of the cell walls of the wood and not merely precipitating them upon the surfaces of the fiber in the form of an envelop, which is the result of the present known methods.

The wood being thus put in proper condition to give up its soluble gums, saps and moisture, and being at a temperature throughout which readily converts water into steam, the heated water is removed from the presence of the wood under conditions that cause the high pressure to give place to a vacuum, preferably about twenty inches; this change of condition from liquid pressure to vacuum being effected as promptly as possible—say in fifteen minutes. This vacuum is maintained for a sufficient time to cause the aqueous content of the wood to largely evaporate, without taking with it, the values of the sap such as resin or resin producing oil; but this evaporation is not continued long enough to greatly cool down the wood or close its pores at the surface, and, in order to continue the withdrawal of moisture from the interior of the wood under conditions that keep up the internal heat of the wood and prevent external drying or checking, this vacuum is gradually replaced by an artificial atmosphere of high temperature, say about 290 F., conveniently created by supplying live steam to the interior of the container of the wood, through the medium of perforated pipes, and keeping up the temperature by means of steam circulated in closed pipes. Some pressure is maintained during this step, say about thirty pounds—and the step is continued for, say two hours and has the effect of restoring the internal temperature of the wood, keeping its pores open, and keeping the wood's natural preservatives in good permeating condition.

Next, the wood, while thus at high internal temperature and with softened pores favorable to giving up moisture without violence to the structure of the wood, is again subjected to a partial vacuum, say of about fifteen inches, but this time under heat, as for instance, by shutting off perforated pipes, but still maintaining a flow of steam in the closed heating pipes employed in the preceding steps. This step is preferably continued for about two hours, but the vacuum may be increased—say to twenty-five inches—toward the end of the step, say for the last half hour thereof. This step also has the effect of causing uniform distribution throughout the wood structure of the wood's contained resins or other natural preservatives. The wood now having its saps and soluble gums removed therefrom, its structures softened and its pores opened up, it is submerged in a foreign preservative under pressure, until the preservative and the wood's resins or other natural preservatives are conveyed into the interstices of the wood and the fibers thereof penetrated thereby. Finally a vacuum is employed to remove from the cells of the wood the excess foreign preservative and thus cut down the cost of the treatment.

I claim:

1. As a new article of manufacture, wood having its gummy sap matters removed therefrom and a foreign preservative and its natural preservatives disseminated throughout the wood to replace the gummy sap matters.

2. As a new article of manufacture, dry wood having its water soluble constituents removed therefrom and its individual fibers permeated with its natural preservatives and a foreign preservative to replace the water soluble constituents.

3. As a new article of manufacture, wood having its gummy sap matters removed from the interstices thereof and the interstices filled with its natural preservatives and a foreign preservative to replace the gummy sap matters.

4. As a new article of manufacture, wood having its gummy sap matters removed therefrom and its natural preservatives and a foreign preservative disseminated therethrough and dried therein to replace the gummy sap matters.

5. As a new article of manufacture, wood having its fibers enlarged and its gummy sap matters removed therefrom and its natural preservatives and a foreign preservative disseminated therethrough to replace the gummy sap matters.

6. As a new article of manufacture, wood having its gummy sap matters removed therefrom, its individual fibers enlarged and its interstices filled with its natural preservatives and a foreign preservative to replace the gummy sap matters.

7. As a new article of manufacture, a wood having a portion of its soluble part of its sap removed and the preservative part of its sap, or as much of it as has not been converted into soluble constituents retained and set therein, a foreign preservative intermingled with the natural preservative, the natural and foreign preservatives permeating the individual fibers and replacing the gummy sap matters.

8. As a new article of manufacture, a wood having its gummy sap matters removed therefrom and its individual fibers permanently enlarged by the permeation thereof of the natural preservatives of the wood combined with a foreign preservative, the preservatives replacing the gummy sap matter.

9. As a new article of manufacture, a wood having its individual fibers enlarged and permeated by its natural preservative and a foreign preservative.

10. As a new article of manufacture, a dry wood having its natural preservative and a foreign preservative permeated through the fibers and set therein.

In testimony whereof I affix my signature.

FREDERICK K. FISH, Jr.